United States Patent [19]
Tohya

[11] Patent Number: 5,343,378
[45] Date of Patent: Aug. 30, 1994

[54] POWER CIRCUIT
[75] Inventor: Hirokazu Tohya, Tokyo, Japan
[73] Assignee: NEC Corporation, Tokyo, Japan
[21] Appl. No.: 10,196
[22] Filed: Jan. 28, 1993
[30] Foreign Application Priority Data Jan. 30, 1992 [JP] Japan .................................. 4-014949
Jan. 30, 1992 [JP] Japan .................................. 4-014950

[51] Int. Cl.$^5$ ........................................... H02M 3/335
[52] U.S. Cl. .......................................... 363/21; 363/37; 363/40
[58] Field of Search ................... 363/21, 29, 40, 37, 363/95, 131, 56, 55, 19, 97, 15

[56] References Cited
U.S. PATENT DOCUMENTS

| | | | |
|---|---|---|---|
| 4,523,139 | 6/1985 | Schwarz et al. | 320/40 |
| 4,706,009 | 11/1987 | Schwarz | 320/22 |
| 5,019,955 | 5/1991 | Hoeksma | 363/21 |
| 5,168,435 | 12/1992 | Kobayashi et al. | 363/20 |
| 5,200,886 | 4/1993 | Schwarz et al. | 363/49 |
| 5,208,432 | 5/1993 | Han | 219/10.55 B |
| 5,222,015 | 6/1993 | Nakagawa | 363/21 |
| 5,227,964 | 7/1993 | Furuhata | 363/56 |

OTHER PUBLICATIONS
Hirokazu Tohya, "Reduction of the Harmonics and Correction . . . Factor in the Switching Regulator", Proceedings of Chinese-Japanese Power Electronics Conference, Sep. 13-14, 1992, pp. 474-481.

Primary Examiner—Steven L. Stephan
Assistant Examiner—Adolf Berhane
Attorney, Agent, or Firm—Sughrue, Mion, Zinn, Macpeak & Seas

[57] ABSTRACT

In a switching power supply circuit, a large capacity second capacitor is provided in parallel with a smoothing capacitor. When the charging voltage of the smoothing capacitor is larger than that of the second capacitor and energy is discharged from the smoothing capacitor, accumulations of exciting energy of a transformer in the second capacitor during OFF state of a switching MOS transistor is controlled, and when the charging voltage of the smoothing capacitor is smaller than that of the second capacitor and energy is discharged from the second capacitor, accumulations of the exciting energy of a transformer in the smoothing capacitor during OFF state of the MOS transistor is controlled. Moreover, an exciting current from either the smoothing capacitor or the second capacitor is selectively supplied by a two-diode circuit to the smoothing capacitor or the second capacitor, depending on the levels of the voltages of the smoothing capacitor and the second capacitor.

4 Claims, 5 Drawing Sheets

POWER CIRCUIT

BACKGROUND OF THE INVENTION

The present invention relates generally to a power circuit. More particularly, the invention relates to a forward type power circuit which converts a direct current power into an alternating current power by switching operation and further converts the alternating current power into a stable direct current power.

As such type of switching power circuits, there are single transistor forward type and double transistor forward type power circuits. The former circuit is illustrated in FIG. 6. An alternating current power supply $e_1$ is converted into a direct current through a full-wave rectification by a rectifier $RC_1$, and then smoothed by a capacitor $C_1$. The smoothed direct current output is supplied to a series circuit of a primary winding $N_1$ of a transformer $TR_1$ and a switching MOS transistor $Q_1$. By controlling switching of this transistor $Q_1$, the direct current power is inverted into the alternating current power. Thereafter, the alternating current power is again converted into the direct current power through a rectification circuit constituted of diodes $D_3$ and $D_4$. This direct current power is smoothed and stabilized by a choke coil $L_1$ and a capacitor $C_3$ and stabilized by a PWM control circuit (not shown), and thus becomes a desired direct current voltage to be derived between both ends 1-2 of the capacitor $C_3$.

A tertiary winding $N_3$ is provided in the transformer $TR_1$. By connecting the tertiary winding $N_3$ to a diode $D_1$, an exciting energy (shown as an exciting current $i_3$) induced in the transformer $TR_1$ upon turning OFF of the transistor $Q_1$ is regenerated toward the rectifier $RC_1$ through the diode $D_1$ for protecting the switching transistor $Q_1$ from being damaged.

FIG. 7 shows a operational waveform of the power circuit of FIG 6, in which are shown the alternating current input voltage $e_1$, a voltage $VC_1$ between both ends of the capacitor $C_1$, and an input direct current $i_1$, respectively.

Since it is required to minimize a ripple component of a full-wave rectified voltage waveform shown by the broken line of (b) of FIG. 7, and to compensate temporary drop of the alternating current voltage $e_1$, the capacitor $C_1$ is desired to have sufficiently large capacity. As a result, the voltage $VC_1$ at both ends of the capacitor $C_1$ becomes a direct current at a level in the vicinity of the peak of the full-wave rectified waveform, as shown in FIG. 7(b). However, the output current $i_1$ of the rectifier $RC_1$ has a waveform with substantially small duty cycle ($T_1/T=D$), and, on the other hand, with substantially high peak value, as shown in FIG. 7(c).

FIG. 8 shows a double transistor forward type power circuit, in while like elements to those in FIG. 6 are identified by the like reference numerals. In the shown circuit, the switching MOS transistor $Q_1$, the primary winding $N_1$ and a switching MOS transistor $Q_2$ are connected in series in this order between both ends of the capacitor $C_1$. A diode $D_5$ is inserted between a Junction between the transistor $Q_1$ and the primary winding $N_1$ and a negative voltage terminal of the rectifier $RC_1$. Also, a diode $D_6$ is inserted between a Junction between the transistor $Q_2$ and the primary winding $N_1$ and a positive voltage terminal of the rectifier $RC_1$.

An exciting energy (shown as the exciting current $i_3$) induced in the primary winding $N_1$ while both transistors $Q_1$ and $Q_2$ are OFF, is regenerated toward the rectifier $RC_1$ by a loop formed by the diode $D_5$, the winding $N_1$ and the diode $D_6$, the switching transistors $Q_1$ and $Q_2$ are protected from being damaged.

With this circuit, the desired direct current voltage can be attained between the terminals 1-2 by simultaneously turning both transistors $Q_1$ and $Q_2$. The signal waveforms at respective part during operation of this circuit are identical to those in FIG. 7. Therefore, the output current $i_1$ of the rectifier $RC_1$ has substantially small duty cycle and substantially high peak value.

As set forth above, in the conventional forward type power circuit, for minimizing the ripple component of the direct current voltage after rectification and smoothing and for assuring a stable operation of a DC—DC converter at the later stage by compensating the temporary drop of the alternating current voltage, it becomes necessary to apply the alternating current having substantially small duty cycle and substantially large peak value. As a result, high level high harmonic current may flow through a power distribution system to affect by heating of the powering capacitor or a power transistor. Also, a power factor (a ratio of an effective power versus a null power) of the power circuit can be lowered.

SUMMARY OF THE INVENTION

Therefore, it is an object of the present invention to provide a forward type power circuit which can prevent generation of high harmonic current and to substantially improve a power factor.

In order to accomplish the above-mentioned and other objects, a power circuit generally comprises a rectifying means for rectifying an alternating current input, a smoothing capacitor means for smoothing a rectified output, a switching means for switching a smoothed direct current output, a transformer means for receiving a switching output at a primary winding and transferring the received output to a secondary winding as an alternating current power, and means for converting the alternating current power into a stable direct current power. The power circuit further comprises a second capacitor means provided in parallel to the smoothing capacitor, and control means for controlling in such a manner that when a charging voltage of the smoothing capacitor means is larger than that of the second capacitor and thus an energy is discharged from the smoothing capacitor means, accumulation of an exciting energy of the transformer means in the second capacitor during OFF state of the switching means is controlled, and when the charge voltage of the smoothing capacitor means is smaller than that of the second capacitor and an energy is discharged from the second capacitor, accumulation of exciting energy of the transformer in the smoothing capacitor during OFF state of the switching means is controlled.

BRIEF DESCRIPTION OF THE DRAWINGS

The present invention will be understood more fully from the detailed description given herebelow and from the accompanying drawings of the preferred embodiments of the invention, which, however, should not be taken to be limitative to the invention, but are for explanation and understanding only.

In the drawings.

DESCRIPTION OF THE PREFERRED EMBODIMENT

Figure 1:
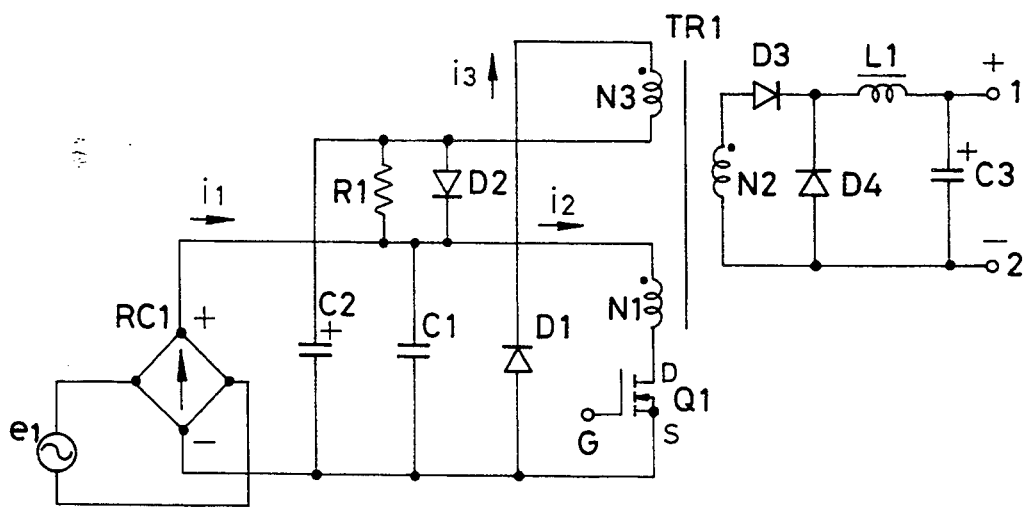
FIG. 1 is a circuit diagram of one embodiment of the present invention.
Figure 6:
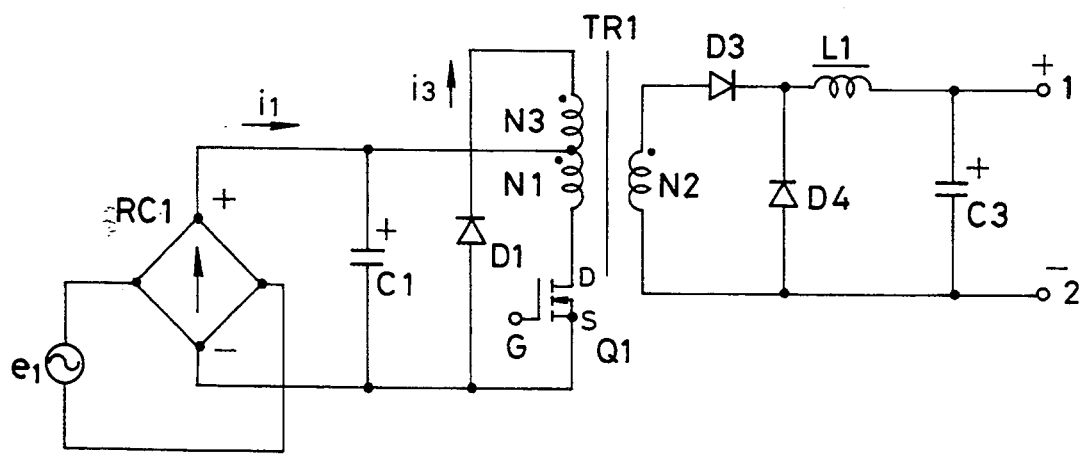
FIG. 6 is a circuit diagram showing the conventional single transistor forward type power circuit.
Figure 7:
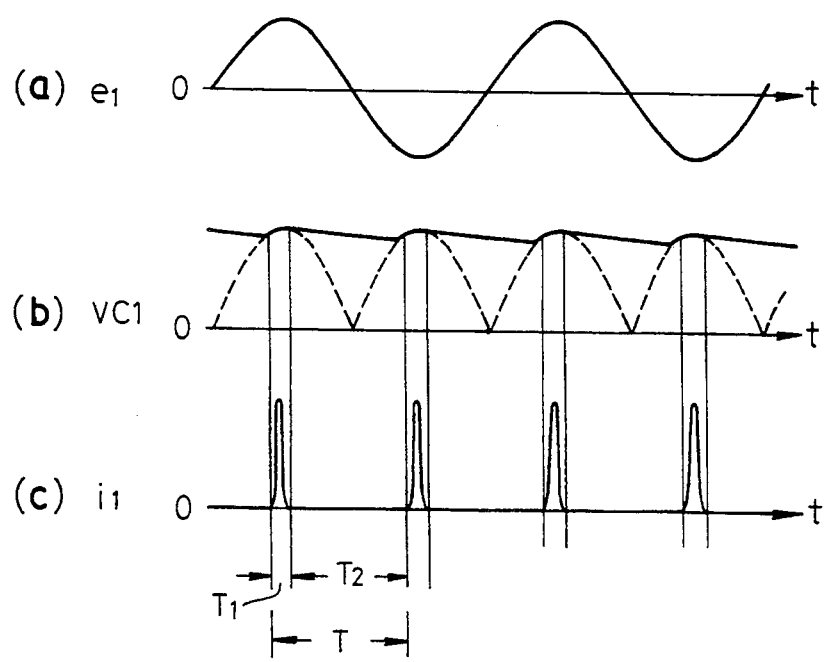
FIG. 7 is a waveform of the operation of the circuit of FIG. 6.

FIG. 1 is a circuit diagram of one embodiment of a single transistor forward type power circuit, in which like elements to those in FIG. 6 will be identified by like reference numerals. A smoothing capacitor $C_1$ is connected between both output terminals of a rectifier $RC_1$ which is adapted to perform full-wave rectification of an alternating current power supply $e_1$. A primary winding of a transformer $TR_1$ and a switching MOS transistor $Q_1$ are connected in series between both ends of the capacitor $C_1$. An output of a secondary winding of the transformer $TR_1$ is rectified by diodes $D_3$ and $D_4$, and then, smoothed and stabilized by a choke coil $L_1$ and a capacitor $C_3$. Therefore, through both ends 1-3 of the capacitor $C_3$, a stable direct current voltage can be attained. The construction set forth above is identical to that the prior art illustrated in FIG. 6.

A tertiary winding $N_3$ for processing an exciting current of the transformer $TR_1$ is separated from the primary winding $N_1$. One end of the tertiary winding $N_3$ is connected to a negative voltage terminal of the rectifier $RC_1$ through a diode $D_1$. The other end of the tertiary winding $N_3$ is connected to one end of a large capacity capacitor $C_2$, one end of a resistor $R_2$ and an anode of a diode $D_2$, respectively. The other end of the capacitor $C_2$ is connected to the negative voltage terminal of the rectifier $RC_1$. Also, the other end of the resistor $R_1$ and the cathode of the diode $D_2$ are connected to a positive voltage terminal of the rectifier $RC_1$.

The capacitor $C_2$ has larger capacity in comparison with the smoothing capacitor $C_1$. The resistor $R_1$ serves as a charging resistor for the capacitor $C_2$. The diode $D_2$ is turned ON and OFF depending upon the level of the charge voltage for the capacitors $C_1$ and $C_2$. The diode $D_2$ functions to selectively supply the exciting energy (exciting current $i_3$) of the transformer $TR_1$ induced on the tertiary winding $N_3$ when the transistor $Q_1$ is held OFF, to either capacitor $C_1$ or $C_2$.

Figure 3:
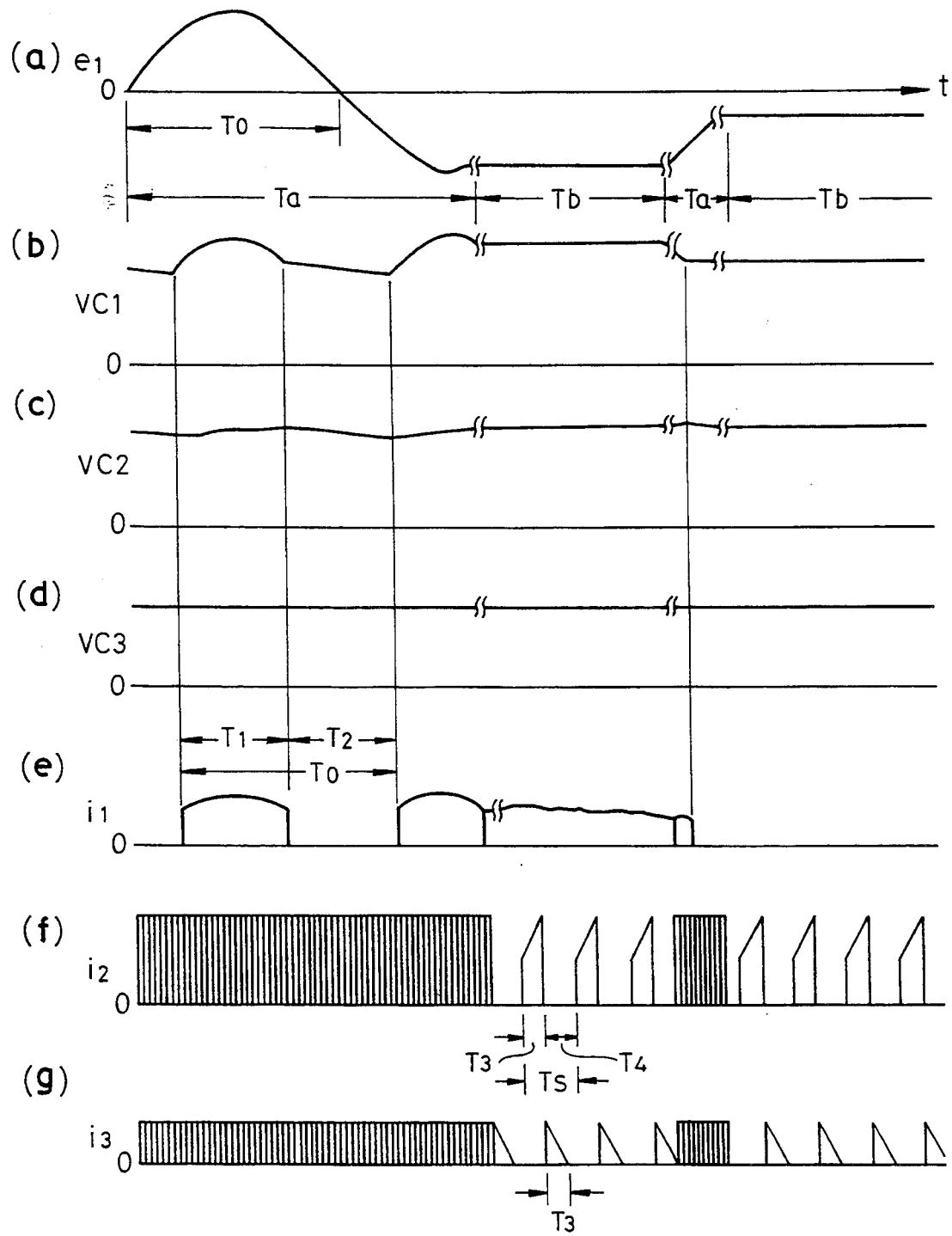
FIG. 3 shows operational waveforms at respective points of the embodiments of the invention.

FIG. 3 shows waveforms of operation of the circuit illustrated in FIG. 1. A unit on a horizontal axis t of a period Ta is illustrated so that a period $T_0$ becomes 10 ms (when a period of the alternating current power supply $e_1$ is assumed to be 50 Hz). On the other hand, a unit on the horizontal axis of the period $T_b$ is illustrated in an expanded form in the order of $\mu s$. It should be noted that $VC_1$ represents a charging voltage for the capacitor $C_1$, $VC_2$ represents a charging voltage for the capacitor $C_2$, and $VC_3$ represents a charging voltage for the capacitor $C_3$. Also, $i_1$ represents an output current of the rectifier $RC_1$, $i_2$ represents a current of the primary winding $N_1$, and $i_3$ represents a current in the tertiary winding.

Discussing the basic operation of the shown circuit, at a period $T_1$, a power supplied to a load through the output terminals 1-2 and the exciting energy of the transformer $TR_1$ are supplied through the rectifier $RC_1$. While the transistor $Q_1$ is held OFF, the exciting energy of the transformer $TR_1$ is accumulated in the capacitor $C_2$. On the other hand, during a period $T_2$, the power supply from the rectifier $RC_1$ is terminated, and in replace, all output power is supplied from the capacitor $C_2$. During this period, the power is supplied to the load through the output terminals 1-2 and the exciting energy of the transformer $TR_1$ are supplied similarly to that in the period $T_1$. However, while the transistor $Q_1$ is held OFF, the exciting energy for the transformer $TR_1$ is regenerated to the capacitor $C_1$.

Further detailed discussion will be given herebelow. When the alternating current voltage $e_1$ is charged, the capacitor $C_1$ is charged up to the peak value of the alternating current voltage $e_1$. Subsequently, ON/OFF control of the switching transistor $Q_1$ is performed with a period $T_s$ (see FIG. 3(f). During the ON period ($T_3$) of the transistor $Q_1$, the exciting current $i_2$ for the transformer $TR_1$ is supplied to the primary winding $N_1$. On the other hand, during the OFF period ($T_4$) of the transistor $Q_1$, the exciting energy accumulated in the transformer $TR_1$ is applied to the large capacity capacitor $C_2$ as the exciting current $i_3$ from the tertiary winding $N_3$ via the diode $D_1$ for regeneration of the energy.

By repeating these conditions over the given period ($T_1$), the charge voltage of the capacitor $C_1$ becomes lower than that of the capacitor $C_2$. Then, exciting for the transformer $TR_1$ is performed via the capacitor $C_2$ and the resistor $R_1$. Accordingly, during the ON period ($T_3$) of the transistor $Q_1$, the exciting current $i_2$ flows from the capacitor $C_2$ to the primary winding $N_1$. On the other hand, the during OFF period ($T_4$) of the transistor $Q_1$, the energy accumulated in the transformer $TR_1$ is applied as the exciting current $i_3$ to the smoothing capacitor $C_1$ from the tertiary winding $N_3$ via the diode $D_1$ and the diode $D_2$ in the ON state.

By repeating these conditions over the given period ($T_2$), the charge voltage for the capacitor $C_2$ becomes lower than that for the capacitor $C_1$. Accordingly, again, the operation in the period $T_1$ is resumed. Subsequently, with a period $T_0$ ($T_1 + T_2$), the above discussed operation is repeated.

The above-mentioned operation will be further discussed quantitatively.

Assuming that the power circuit is adapted to output a power in the order of 100 W. Then, the capacitor $C_1$ is provided a capacity in the order of 1 $\mu F$. On the other hand, the second capacitor $C_2$ is provided a much larger capacity in the order of several thousands $\mu F$. Also, the resistor $R_1$ is adapted for initially charging the capacitor $C_2$ and thus is provided a resistance in the order of several tens $\Omega$. When the alternating current power $e_1$ is applied, the capacitor $C_2$ is initially charged by the resistor $R_1$. Subsequently, through the external control, the transistor $Q_1$ initiates switching. When the circuit operation becomes steady state operation and the voltage of the capacitor $C_1$ becomes stable, the exciting energy magnitude EC of the transformer $TR_1$ accumulated in the capacitor $C_2$ during the $T_1$ period and the discharge energy ED supplied for power supply to the load from the capacitor $C_2$ during the $T_2$ period becomes substantially equal to each other ignoring the loss. The exciting current $i_g$ of the transformer $TR_1$ can be expressed by the following equation:

$$i_g = E \cdot t / L_g \quad (1)$$

where E: a voltage value of a rectangular wave applied to the primary winding of the transformer $TR_1$;
t: a time width of the rectangular wave applied to the primary winding of the transformer $TR_1$; and
$L_g$: an inductance of the primary winding of the transformer $TR_1$.

Here, assuming that the power circuit is in normal operation for stabilizing the output voltage, $$E \cdot t = K \text{ (constant)} \quad (2)$$

in the foregoing equation (1).

In FIG. 3, during the period $T_1$ where the potential of the capacitor $C_1$ is higher than that of the capacitor $C_2$, the energy EC accumulated in the capacitor $C_2$ by the exciting energy of the transformer $TR_1$ at every occurrence of ON/OFF of the transistor $Q_1$ can be expressed by the following equation:

$$\begin{aligned} EC &= (1/2) \cdot L_g \cdot i_g \\ &= (K/2L_g) \cdot (T_1/T_s) \end{aligned} \quad (3)$$

On the other hand, in FIG. 3, the period $T_2$ where the potential of the capacitor $C_2$ becomes higher than that of the capacitor $C_1$, the energy ED discharged from the capacitor $C_2$ can be expressed by the following equation, in which the exciting energy of the transformer $TR_1$ is canceled:

$$ED = P_0 \cdot T_2 \quad (4)$$

where $P_0$: an output power of the power source (assumed there are no transformation loss)

In the steady state, the accumulated energy EC and the discharged energy ED are equal to each other, as set forth above. Therefore, from the foregoing equations (3) and (4), the following equation can be established:

$$L_g = (K \cdot T_1)/(2P_0 \cdot T_s \cdot T_2) \quad (5)$$

In the foregoing equation (5), K and $P_0$ are independently set in designing the single transistor forward converter.

Accordingly, the exciting inductance of the transformer $TR_1$ can be determined by setting a ratio $(T_1/T)$ of the period to flow the current from the alternating current power source $e_1$ versus the cycle period upon connection of a maximum load (which is associated with a high harmonic content ratio and power factor). If there is no loss, the peak value of the exciting current becomes constant according to the equation (2), and the charging period and discharging period of the exciting inductance is variable depending upon the charge voltage.

It should be noted that even when a bipolar transistor is employed in place of the MOS FET as the transistor $Q_1$, substantially the same operation can be attained. Also, it is no specifically limited that the winding ratio of the primary winding $N_1$ and the tertiary winding $N_3$ is 1 but can be set at any desired value greater than 1.

Figure 2:
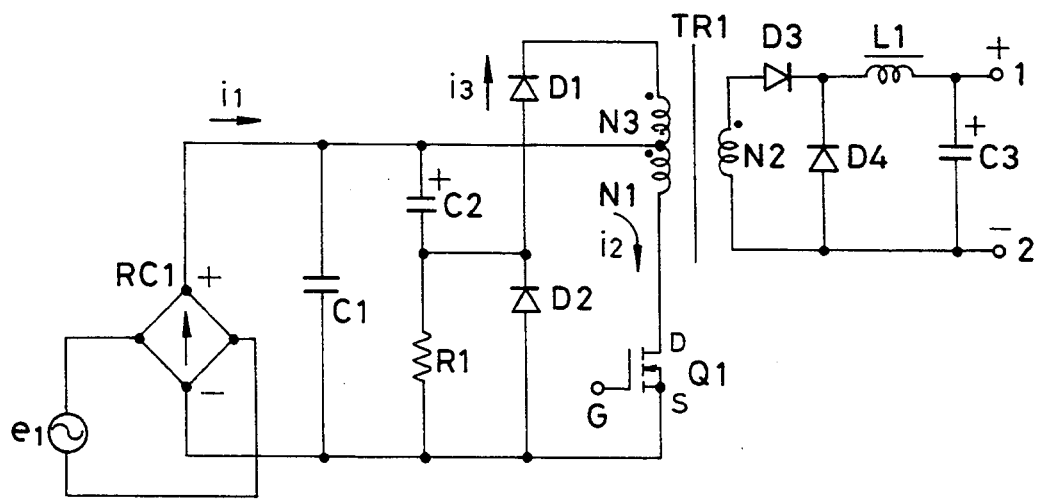
FIG. 2 is a circuit diagram of another embodiment of the present invention.

FIG. 2 shows another embodiment of the single transistor forward type power circuit according to the present invention. In FIG. 2, the like components to those illustrated in FIG. 1 will be represented by like reference numerals. In this example, it is similar to the embodiment of FIG. 1 to connect a series circuit of the large capacity capacitor $C_2$ and the charging resistor $R_1$ between both terminals of the rectifier $RC_1$. However, the positions of the capacitor $C_2$ and the resistor $R_1$ are reversed. Also, at the junction between the capacitor $C_2$ and the resistor $R_1$, the anode of the diode $D_1$ and the cathode of the diode $D_2$ are connected. The cathode of the diode $D_1$ is connected to the one end of the tertiary winding $N_3$. The anode of the diode $D_2$ is connected to the negative voltage terminal of the rectifier $RC_1$. Other constructions are the same as those in the embodiment of FIG. 1.

Even in the shown embodiment, the operation, principle and the waveforms at respective parts of the circuit are equivalent to those of the circuit in FIG. 1. Therefore, while the voltage of the smoothing capacitor $C_1$ is higher than that of the large capacity capacitor $C_2$, the diode $D_2$ is held OFF. Therefore, the energy is discharged from the capacitor $C_1$. While the transistor $Q_1$ is held OFF, the accumulated energy of the transformer $TR_1$ is regenerated to the capacitor $C_2$ from the tertiary winding $N_3$ via the diode $D_1$.

Conversely, while the voltage of the capacitor $C_2$ is higher than that of the capacitor $C_1$, the diode $D_2$ is held ON so that the energy is discharged from the capacitor $C_2$ through the resistor $R_1$. While the transistor $Q_1$ is held OFF, the accumulated energy of the transformer $TR_1$ is regenerated to the capacitor $C_1$ via the diodes $D_1$ and $D_2$.

Figure 4:
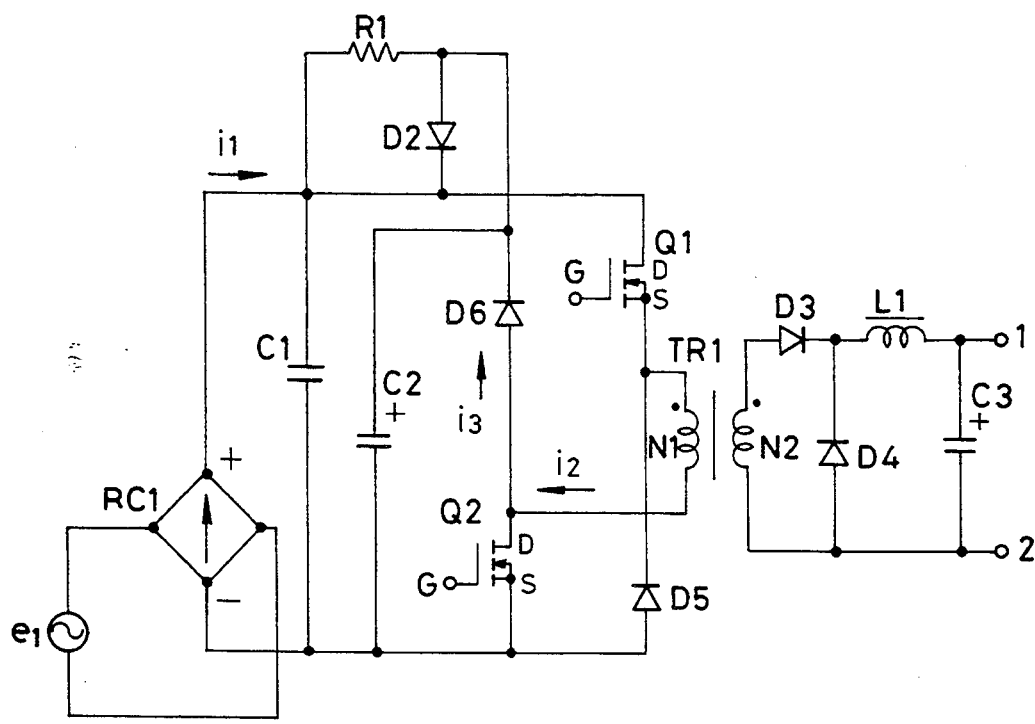
FIG. 4 is a circuit diagram of a further embodiment of the present invention.
Figure 8:
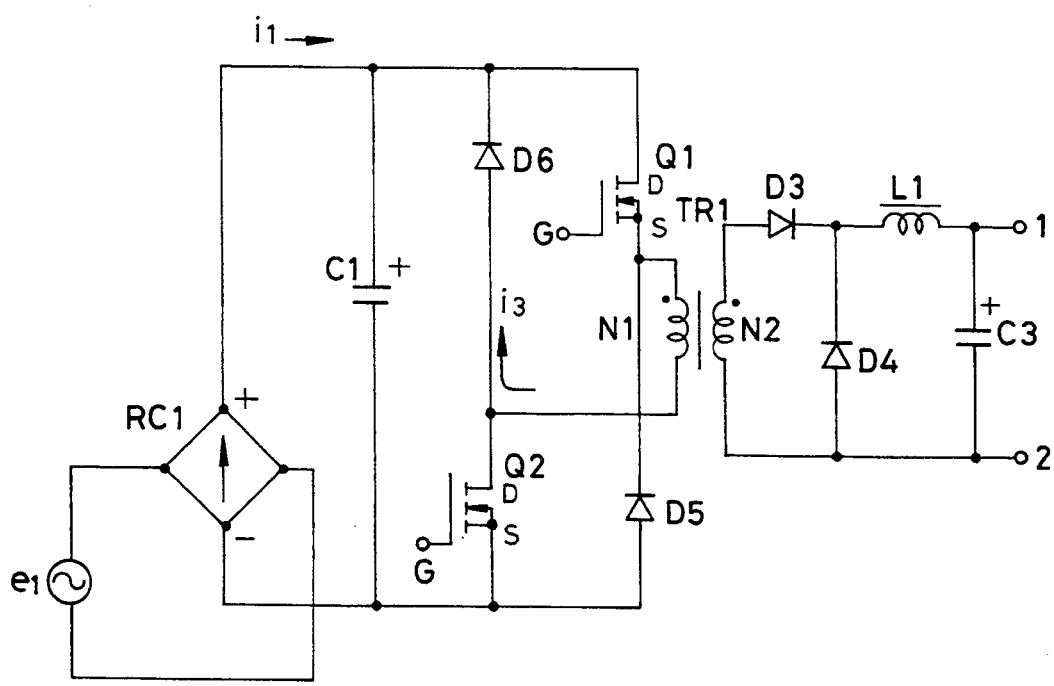
FIG. 8 is a circuit diagram showing the conventional double transistor forward type power circuit.

FIG. 4 shows a further embodiment of a double transistors forward type power circuit according to the present invention, in which the present invention is applied to the circuit of FIG. 8. The like components to those of the embodiment of FIG. 8 will be represented by like reference numerals.

In FIG. 8, the switching MOS transistor $Q_1$, the primary winding $N_1$ of the transformer $TR_1$ and the switching MOS transistor $Q_2$ are connected in series in this order between both ends of the capacitor $C_1$. The diode $D_5$ is inserted between the junction of the transistor $Q_1$ and the primary winding $N_1$ and the negative voltage terminal of the rectifier $RC_1$. Also, the diode $D_6$ is disposed between the Junction of the transistor $Q_2$ and the primary winding $N_1$ and the one end of large capacity capacitor $C_2$. The capacitor $C_2$ is connected to the negative voltage terminal of the rectifier $RC_1$ at the other end.

The charging resistor $R_1$ for the capacitor $C_2$ is disposed between the positive voltage terminal of the rectifier $RC_1$ and the one end of the capacitor $C_2$. The diode $D_2$ is inserted in parallel to the resistor $R_1$. Other constructions are the same as those in FIG. 8.

Even in this circuit, the operation, principle and the waveforms at respective parts of the circuit are equivalent to those of FIGS. 1 and 2. For instance, when the voltage of the smoothing capacitor $C_1$ is higher than that of the large capacity capacitor $C_2$, the diode $D_2$ is held OFF so that the energy is discharged from the capacitor $C_1$. When the transistor is held OFF, the accumulated energy of the transformer $TR_1$ is regenerated to the capacitor $C_2$ as the current $i_3$ through the diode $D_6$.

Conversely, when the voltage of the capacitor $C_2$ is higher than that of the capacitor $C_1$, the diode $D_2$ is held OFF so that the energy is discharged from the capacitor $C_2$ via the resistor $R_1$. While the transistor is held OFF, the accumulated energy of the transformer $TR_1$ is regenerated to the capacitor $C_1$ through the diodes $D_6$ and $D_2$ and the resistor $R_1$.

Figure 5:
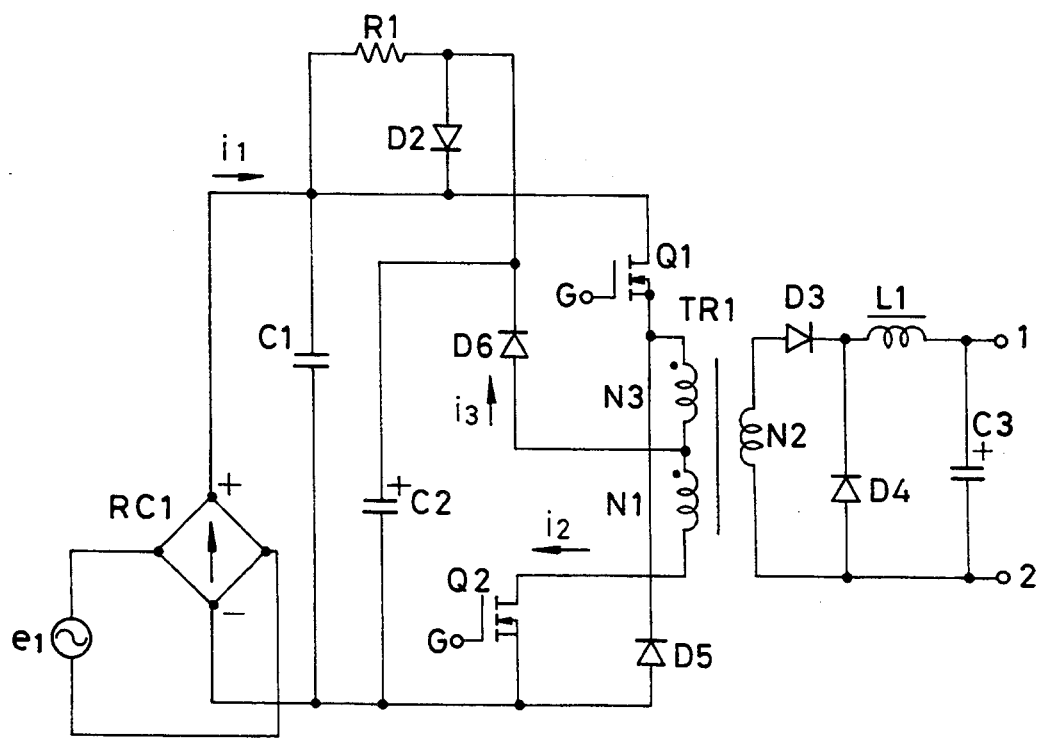
FIG. 5 is a circuit diagram of a still further embodiment of the present invention.

FIG. 5 shows a still further embodiment of the double transistors forward type power circuit according to the present invention. Like reference numerals to those of FIG. 4 represent like components. In the shown embodiment, the primary winding $N_1$ of the transformer $TR_1$ of FIG. 4 is divided into two segments to form the primary winding $N_1$ and the tertiary winding $N_3$. The junction between the both windings $N_1$ and $N_3$ is connected to the one end of the large capacity capacitor $C_2$ via the diode $D_6$. Other constructions, operation and principle are equivalent to those of FIG. 4 and thus the discussion is neglected.

Differences between the circuits in FIGS. 4 and 5 is that, in the circuit of FIG. 4, the duty cycle of switching of the transistor $Q_1$ ($Q_2$) has to be set at a value determined by voltages of the capacitors $C_1$ and $C_2$ ($C_2/(C_1+C_2) \approx$ smaller than $\frac{1}{2}$), whereas, in case of the circuit of FIG. 5, the switching duty cycle of the transistor $Q_1$ ($Q_2$) can be set an appropriate value around $\frac{1}{2}$ by adjusting the winding ration between the primary and tertiary windings $N_1$ and $N_3$ of the transformer $TR_1$. Others are the identical in both circuits, as set forth above.

As set forth above, the conduction period to introduce the current from the alternating current power source can be arbitrary set, as shown in the equation (5) with a simple circuit construction by adjusting the exciting inductance of the transformer forming the forward type DC—DC converter. Accordingly, the current waveform can be a rectangular wave with wide conduction period so as to significantly reduce content of the high harmonic of the alternating current input current and to improve the power factor.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A power circuit comprising:

rectifying means for rectifying an alternating current input;

smoothing capacitor means for smoothing a rectified output;

switching means for switching a smoothed direct current output, said switching means comprising a single switching element connected in series to a primary winding;

transformer means for receiving a switching output at said primary winding and transferring the received output to a secondary winding as an alternating current power;

means for converting said alternating current power into a stable direct current power;

second capacitor means provided in parallel to said smoothing capacitor, said second capacitor means comprising a series circuit of a capacitor and a charging resistor therefor; and control means comprising a tertiary winding provided in said transformer means, a selective supply means for selectively supplying the exciting current generated on said tertiary winding to said smoothing capacitor means or said second capacitor means depending upon the levels of voltages of said smoothing capacitor means and said second capacitor means, an exciting current supply means for selectively supplying the exciting current form one of said smoothing capacitor means and said second capacitor means to said primary winding depending upon the level of the voltage of said smoothing capacitor means and the second capacitor means, a first diode having a cathode connected to one end of said tertiary winding and an anode connected to a negative voltage terminal of said rectifying means, and a second diode having an anode connected to the other end of said tertiary winding and a cathode connected to a positive voltage terminal of said rectifying means, the series junction of said series circuit being connected to the anode of said second diode, said control means capable of operating in such a manner that when a charging voltage of said smoothing capacitor means is larger than that of said second capacitor and thus energy is discharged from said smoothing capacitor means, accumulation of exciting energy of said transformer means in said second capacitor during OFF state of said switching means is controlled, and when the charge voltage of said smoothing capacitor means is smaller than that of said second capacitor and energy is discharged from said second capacitor, accumulation of exciting energy of said transformer in said smoothing capacitor during OFF state of said switching means is controlled.

2. A power circuit comprising:

rectifying means for rectifying an alternating current input;

smoothing capacitor means for smoothing a rectified output;

switching means for switching a smoothed direct current output, said switching means comprising a single switching element connected in series to a primary winding;

transformer means for receiving a switching output at said primary winding and transferring the received output to a secondary winding as an alternating current power;

means for converting said alternating current power into a stable direct current power;

second capacitor means provided in parallel to said smoothing capacitor, said second capacitor comprising a series circuit of a capacitor and a charging resistor therefor; and control means comprising a tertiary winding provided in said transformer means, a selective supply means for selectively supplying the exciting current generated on said tertiary winding to said smoothing capacitor means or said second capacitor means depending upon the levels of voltages of said smoothing capacitor means and said second capacitor means, an exciting current supply means for selectively supplying the exciting current from one of said smoothing capacitor means and said second capacitor means to said primary winding depending upon the level of the voltage of said smoothing capacitor means and the second capacitor means, a first diode having a cathode connected to one end of said tertiary winding, and a second diode having an anode connected to an anode of said first diode and an anode connected to a negative voltage output of said rectifying means, the series junction of said series circuit being connected to the anode of said first diode, said control means capable of operating in such a manner that when a charging voltage of said smoothing capacitor means is larger than that of said second capacitor and thus energy is discharged from said smoothing capacitor means, accumulation of exciting energy of said transformer means in said second capacitor during OFF state of said switching means is controlled, and when the charge voltage of said smoothing capacitor means is smaller than that of said second capacitor and energy is discharged from said second capacitor, accumulation of exciting energy of said transformer in said smoothing capacitor during OFF state of said switching means is controlled.

3. A power circuit comprising:

rectifying means for rectifying an alternating current input;

smoothing capacitor means for smoothing a rectified output;

switching means for switching a smoothed direct current output, said switching means comprising first and second switching elements respectively connected to a primary winding between both ends of said primary winding;

transformer means for receiving a switching output at said primary winding and transferring the received output to a secondary winding as an alternating current power;

means for converting said alternating current power into a stable direct current power;

second capacitor means provided in parallel to said smoothing capacitor, said second capacitor means comprising a series circuit of a capacitor and a resistor; and control means comprising a selectively supplying means for selectively supplying an exciting current generated on said primary winding to one of said smoothing capacitor means and said second capacitor means depending upon the levels of the voltage of said smoothing capacitor means and said second capacitor means, an exciting current supply means for selectively supplying an exciting current to said primary winding from one of said smoothing capacitor and said second capacitor, a third diode having a cathode connected to one end of said primary winding and an anode connected to a negative voltage terminal of said rectifying means, a fourth diode having an anode connected to the other end of said primary winding, and a fifth diode having an anode connected to a cathode of said fourth diode and a cathode connected to a positive voltage terminal of said rectifying means, a series junction of said series circuit being connected to the anode of said fifth diode, said control means capable of operating in such a manner that when a charging voltage of said smoothing capacitor means is larger than that of said second capacitor and thus energy is discharged from said smoothing capacitor means, accumulation of exciting energy of said transformer means in said second capacitor during OFF state of said switching means is controlled, and when the charge voltage of said smoothing capacitor means is smaller than that of said second capacitor and energy is discharged from said second capacitor, accumulation of exciting energy of said transformer in said smoothing capacitor during OFF state of said switching means is controlled.

4. A power circuit comprising:

rectifying means for rectifying an alternating current input;

smoothing capacitor means for smoothing a rectified output;

switching means for switching a smoothed direct current output, said switching means comprising a single switching element connected in series to a primary winding comprising a first winding segment and a second winding segment;

transformer means for receiving a switching output at said primary winding and transferring the received output to a secondary winding as an alternating current power;

means for converting said alternating current power into a stable direct current power;

second capacitor means provided in parallel to said smoothing capacitor, said second capacitor means comprising a series circuit of a capacitor and a charging resistor therefor; and control means comprising a tertiary winding provided in said transformer means, a selective supply means for selectively supplying the exciting current generated on said tertiary winding to said smoothing capacitor means or said second capacitor means depending upon the levels of voltages of said smoothing capacitor means and said second capacitor means, an exciting current supply means for selectively supplying the exciting current from one of said smoothing capacitor means and said second capacitor means to said primary winding depending upon the level of the voltage of said smoothing capacitor means and the second capacitor means, a third diode having a cathode connected to one end of said primary winding and an anode connected to a negative voltage terminal of said rectifying means, a fourth diode having an anode connected to a junction between said first and winding segments, and a fifth diode having an anode connected to a cathode of said fourth diode and a cathode connected to a positive voltage circuit of said rectifying means, the series junction of said series circuit being connected to said anode of said fifth diode, said control means capable of operating in such a manner that when a charging voltage of said smoothing capacitor means is larger than that of said second capacitor and thus energy is discharged from said smoothing capacitor means, accumulation of exciting energy of said transformer means in said second capacitor during OFF state of said switching means is controlled, and when the charge voltage of said smoothing capacitor means is smaller than that of said second capacitor and energy is discharged from said second capacitor, accumulation of exciting energy of said transformer in said smoothing capacitor during OFF state of said switching means is controlled.

* * * * *